(12) United States Patent
Uenlue et al.

(10) Patent No.: US 9,777,134 B2
(45) Date of Patent: Oct. 3, 2017

(54) POWDERY COMPOSITION COMPRISING THERMOPLASTIC POLYURETHANE AND USE THEREOF

(71) Applicant: Timur Uenlue, Zurich (CH)

(72) Inventors: Timur Uenlue, Zurich (CH); Wilfried Leirer, Zurich (CH)

(73) Assignee: Timur Uenlue, Zurich (CH)

( * ) Notice: Subject to any disclaimer, the term of this patent is extended or adjusted under 35 U.S.C. 154(b) by 0 days.

(21) Appl. No.: 14/557,616

(22) Filed: Dec. 2, 2014

(65) Prior Publication Data

US 2015/0152214 A1    Jun. 4, 2015

(30) Foreign Application Priority Data

Dec. 2, 2013    (DE) .................. 10 2013 113 320

(51) Int. Cl.
| | | |
|---|---|---|
| *C08K 5/00* | (2006.01) | |
| *C08G 18/32* | (2006.01) | |
| *C08K 5/136* | (2006.01) | |
| *C08K 3/00* | (2006.01) | |
| *C08K 3/08* | (2006.01) | |
| *C08K 5/3432* | (2006.01) | |
| *C08L 75/04* | (2006.01) | |
| *B29C 67/00* | (2017.01) | |
| *B33Y 70/00* | (2015.01) | |
| *C08G 18/72* | (2006.01) | |

(52) U.S. Cl.
CPC .......... *C08K 5/136* (2013.01); *B29C 67/0077* (2013.01); *B33Y 70/00* (2014.12); *C08G 18/32* (2013.01); *C08K 3/005* (2013.01); *C08K 3/08* (2013.01); *C08K 5/0058* (2013.01); *C08K 5/3432* (2013.01); *C08L 75/04* (2013.01); *C08G 18/72* (2013.01); *C08G 2140/00* (2013.01); *C08K 2003/085* (2013.01); *C08K 2003/0806* (2013.01); *C08K 2003/0831* (2013.01); *C08K 2003/0893* (2013.01); *Y10T 428/2982* (2015.01)

(58) Field of Classification Search
CPC ............... C08K 3/08; C08K 2003/086; C08K 2003/085; C08K 2003/0893; C08G 18/72; C08G 18/32
See application file for complete search history.

(56) References Cited

U.S. PATENT DOCUMENTS

| | | | | |
|---|---|---|---|---|
| 5,824,738 A | * | 10/1998 | Humphrey ........... | C08G 18/227 524/589 |
| 6,166,135 A | | 12/2000 | Kaufhold et al. | |
| 6,177,508 B1 | * | 1/2001 | Ohmori ............. | C08G 18/0866 524/231 |
| 2006/0142531 A1 | | 6/2006 | Peerlings et al. | |
| 2007/0241482 A1 | * | 10/2007 | Giller .................. | B29C 67/0066 264/494 |
| 2011/0245449 A1 | * | 10/2011 | Boudou ............. | C08G 18/0895 528/58 |
| 2012/0245280 A1 | * | 9/2012 | Tsudo .................... | C08G 18/12 524/590 |
| 2012/0245281 A1 | * | 9/2012 | Tsudo .................... | B29C 41/18 524/590 |
| 2013/0237664 A1 | * | 9/2013 | Watanabe ............. | B29C 41/003 524/590 |

FOREIGN PATENT DOCUMENTS

| | | |
|---|---|---|
| DE | 19800287 | 7/1999 |
| DE | 10122492 | 11/2002 |
| DE | 102004062476 | 7/2006 |

OTHER PUBLICATIONS

Office Action for German Application No. 102013113320.7 (dated May 27, 2014).
KRYSTALFLEX® Product Data Sheet, issued on Aug. 24, 2010 (2 pages).

* cited by examiner

*Primary Examiner* — Michael L Leonard
(74) *Attorney, Agent, or Firm* — Klarquist Sparkman, LLP

(57) ABSTRACT

The invention relates to a powdery composition for use in the layer by layer manufacturing of three-dimensional molded bodies. The composition comprises at least one powder made of an aliphatic thermoplastic polyurethane (TPU) and is characterized in that the TPU powder has a melting temperature of less than 135° C. and a melting viscosity at 150° C. of at most 800 Pa·s.

15 Claims, No Drawings

POWDERY COMPOSITION COMPRISING THERMOPLASTIC POLYURETHANE AND USE THEREOF

CROSS REFERENCE TO RELATED APPLICATION

The present application claims priority from pending German Patent Application No. 10 2013 113 320.7, filed Dec. 2, 2013, which is incorporated herein by reference.

FIELD

The invention relates to a powdery composition based on thermoplastic polyurethane for use in the layer by layer manufacturing of three-dimensional molded bodies, in particular by laser sintering. Moreover, the invention relates to a method for the manufacture of the three-dimensional molded body and the use of the composition in layer by layer manufacturing processes.

BACKGROUND

The quick and inexpensive provision of prototypes (rapid prototyping) is a task frequently set in recent times. Methods working on the basis of powdery materials in which the desired structures are formed layer-wise by selective melting and solidification are particularly suitable. The methods are also suited for the fabrication of small-scale series.

A method that is especially well suited for the purpose of rapid prototyping or the manufacture of components in small-scale series is selective laser sintering. In this method, plastic powders contained in a chamber are selectively exposed to a laser beam for a short period of time causing the powdery particles hit by the laser beam to melt. The melted particles blend into each other and solidify quickly to form a solid mass. In this method, three-dimensional bodies can be produced in a simple and quick way by repeated exposure of continuously applied powder layers.

Plastic powders made of polyester, polyvinyl chloride, polyacetal, polypropylene, polyethylene, polystyrene, polycarbonate, poly-(N-methylmethacrylamide) (PMMI), polymethylmethacrylate (PMMA) and polyamide or mixtures thereof can be used for selective laser sintering. In practice, mainly powders made of polyamide-12 have been used.

The use of powders made of an aliphatic thermoplastic polyurethane (TPU) for the purpose of selective laser sintering has been known from DE 10 2010 062 875, in which the TPU powder is used for the manufacture of automotive components by laser sintering.

The production of aliphatic thermoplastic polyurethanes is for example described in DE 198 00 287 A1, DE 10 2006 021 734 A1 and DE 10 2008 006 004 B3, which are incorporated herein by reference. In addition, a powder made of thermoplastic polyurethane suitable for use in laser sintering processes is commercially available under the trade name Desmosint™ X 92 A-1 (Bayer Material Science AG).

The TPU powder used so far for the laser sintering process has a high melting temperature of more than 150° C. and a relatively high melting viscosity. Furthermore, the powders are recyclable only to a limited degree. Although the components made of the known TPU powders exhibit good mechanical properties, they may have surface defects such as shrink marks.

SUMMARY

It is an object of the invention to provide a plastic powder for use in laser sintering processes exhibiting low energy expenditure when placed in the laser sintering machine and resulting in high-quality components.

In one aspect, the present invention is a powdery composition suitable for use in the layer by layer manufacturing of three-dimensional molded bodies, in particular by selective laser sintering. The composition comprises at least one powder made of an aliphatic thermoplastic polyurethane (TPU) wherein the TPU powder has a melting temperature of less than 135° C. and a melting viscosity at 150° C. of at most 800 Pa·s.

The low melting temperature of the TPU powder allows a further decrease of the process temperature in laser sintering. Thus, the powder bed does not have to be excessively heated. The energy density of the laser can also be reduced. Thus, the laser sintering process can be performed energy-efficiently.

In addition, the low thermal stress of the TPU powder during the laser sintering process increases the reusability of the unsintered material. The composition in accordance with the present invention does not yellow and can be reused for at least 6 times by suitable sieving in a known manner.

In addition, due to the low melting temperature and the low melting viscosity of the TPU powder used in the composition in accordance with the present invention, laser sintering can be performed by single exposure of the sinterable material. Multiple exposure, as usually applied in the state of the art, is not necessary. At the same time, the tendency of generating smoke during exposure is reduced.

Due to the low meting viscosity of the TPU powder in the composition in accordance with the present invention the component made thereof has a high-quality surface and a good edge sharpness. Thus, regular post-processing is not necessary.

Having generally described this invention, a further understanding can be obtained by reference to certain preferred embodiments which are provided herein for purposes of illustration only, and are not intended to be limiting unless otherwise specified.

DESCRIPTION OF PREFERRED EMBODIMENTS

Aliphatic TPU for use in the present invention is preferably made of linear polyols (macrodiols), such as polyester, polyether or polycarbonate diols, organic diisocyanates and mostly difunctional short-chain alcohols (chain extenders), and produced continuously or discontinuously. The thermoplastic polyurethane elastomers can be formed either step by step in a prepolymer dosing process or by simultaneous reaction of all components in one step.

Aliphatic or cycloaliphatic diisocyanates or any mixture of these diisocyanates are preferably used as organic diisocyanates. Examples of aliphatic diisocyanates are ethylene diisocyanate, 1,4-tetramethylene diisocyanate, 1,6-hexamethylene diisocyanate and 1,12-dodecane diisocyanate. Examples of cycloaliphatic diisocyanates are isophorone diisocyanate, 1,4-cyclohexane diisocyanate, 1-methyl-2,4-cyclohexane diisocyanate and 1-methyl-2,6-cyclohexane diisocyanate as well as the corresponding isomer mixtures, 4,4'-dicyclohexylmethane diisocyanate, 2,4'-dicyclohexylmethane diisocyanate and 2,2'-dicyclohexylmethane diisocyanate as well as the corresponding isomer mixtures. Preferably, 1,6-hexamethylene diisocyanate, 1,4-cyclohexane diisocyanate, isophorone diisocyanate and dicyclohexylmethane diisocyanate are used. The diisocyanates mentioned can be used as a single compound or as a mixture of each other.

Preferably, one or several compounds selected from the group consisting of aliphatic diols with 2 to 14 carbon atoms, such as ethanediol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane and neopentyl glycol are used as chain extenders. Particularly preferred chain extenders are ethanediol, 1,4-butanediol, 1,6-hexanediol and 1,4-dimethanolcyclohexane. Apart from that, small amounts of triols may also be added.

Preferred polyol components are polyester, polyether and polycarbonate diols or any mixtures thereof, in particular those with a number-average molecular weight $M_n$ of 450 to 6,500.

Suitable polyether diols can be formed by reacting one or several alkylene oxides with 2 to 4 carbon atoms in the alkylene group with a starter molecule having two active hydrogen atoms bound to it. Ethylene oxide, 1,2-propylene oxide, epichlorohydrin, 1,2-butylene oxide and 2,3-butylene oxide can be used as alkylene oxides. Preferably, ethylene oxide, propylene oxide and mixtures of 1,2-propylene oxide and ethylene oxide are used. The alkylene oxides can be used as a single compound, alternately, successively or as a mixture. Water, amino alcohols such as N-alkyldiethanolamine, for example N-methyldiethanolamine, and diols such as ethylene glycol, 1,3-propylene glycol, 1,4-butanediol and 1,6-hexanediol can be considered as starter molecules. If needed, mixtures of the starter molecules can be used.

Further suitable polyether polyols are the polymerization products of tetrahydrofuran containing hydroxyl groups.

The substantially linear polyether diols can be used as a single compound or as a mixture of each other.

For example, suitable polyester diols can be made of aliphatic dicarboxylic acids having 2 to 12 carbon atoms, preferably 4 to 6 carbon atoms, and polyhydric alcohols. Examples of suitable dicarboxylic acids are succinic acid, glutaric acid, adipic acid, suberic acid, azelaic acid and sebacic acid. The dicarboxylic acids can be us as a single compound or as a mixture. Examples of polyhydric alcohols are glycols with 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol or dipropylene glycol. Depending on the desired properties, the polyhydric alcohols can be used as a single compound or as a mixture of each other. Esters of carbonic acid with the diols mentioned, in particular those with 4 to 6 carbon atoms, such as 1,4-butanediol or 1,6-hexanediol, condensation products of hydroxycarboxylic acids, such as hydroxycaproic acid, or polymerization products of lactones, such as optionally substituted caprolactones are also suitable. Ethanediol polyadipates, 1,4-butanediol polyadipates, ethanediol-1,4-butanediol polyadipates, 1,6-hexanediol neopentyl glycol polyadipates, 1,6-hexanediol-1,4-butanediol polyadipates and polycaprolactones are preferably used as polyester diols. The polyester diols can be used as a single compound or as a mixture of each other.

The TPU powder for the composition in accordance with the present invention is preferably made from a thermoplastic polyurethane by mechanical processing such as grinding. For example, a cast polyurethane block can be ground into a fine, powdery material by means of a grinder. By sieving the powdery material after grinding a sieve fraction of the TPU powder with the desired grain size distribution is obtained.

According to a preferred embodiment, the grain size distribution of the TPU powder ranges from 0 to 120 µm, in particular from 0 to 110 µm, preferably from 0 to 100 µm, more preferably from 1 to 95 µm, even more preferably from 1 to 90 µm and particularly preferably from 1 to 85 µm.

The number-average grain diameter d50 can be determined by laser diffraction. Preferably, the TPU powder has a number-average grain diameter d50 in a range of between 40 and 70 µm, particularly preferably between 50 and 60 µm.

Due to the narrow grain size distribution, the powder bed in the laser sintering machine can have lower layer thicknesses of less than 100 µm. Thus, even more delicate structures can be formed by laser sintering.

The melting viscosity at 150° C. of the TPU powder used in the composition in accordance with the present invention preferably ranges from 200 to 800 Pa·s, preferably to 700 Pa·s, more preferably from 200 to 550 Pa·s, even more preferably from 200 to 520 Pa·s and particularly preferably to 420 Pa·s.

In accordance with the present invention, the melting temperature of the TPU powder is at most 135° C. According to a preferred embodiment, the melting temperature is at most 130° C., more preferably at most 125° C., even more preferably at most 115° C. and particularly preferably at most 110° C.

The crystallization temperature (peak) of the aliphatic TPU powder is preferably at least 30° C., more preferably between 30 and 80° C. and particularly preferably in the range of 30 to 60° C.

The melting temperature and the crystallization temperature of the TPU powder can be determined pursuant to ISO 11357-3 by means of dynamic differential calorimetry.

The bulk density of the TPU powder in the composition in accordance with the present invention is preferably at least 480 g/l, as measured according to DIN EN ISO 60. According to a preferred embodiment, the bulk density is in a range of from 480 g/l up to 600 g/l, preferably up to 580 g/l, more preferably up to 560 g/l, even more preferably up to 540 g/l, even more preferably up to 535 g/l and particularly preferably up to 500 g/l.

The high bulk density of the TPU powder in the composition in accordance with the present invention results in an improved dosability and an improved pourability as compared to the known TPU powders. Thus, less shrink marks are formed when applying the powder bed layer by layer, which further improves the quality of the molded body produced by laser sintering.

In the powdery composition, the TPU powder is preferably contained at a ratio of at least 30% w/w. Preferably the ratio is at least 50% w/w, preferably at least 70% w/w, more preferably at least 80% w/w, even more preferably at least 90% w/w and particularly preferably at least 99% w/w, related to the overall weight of the composition.

In a preferred embodiment, the TPU powder comprises an anti-bacterial agent. Preferably, the anti-bacterial agent is a metal powder such as silver, zinc or copper, or salt or a complex thereof. Examples of suitable anti-bacterial agents are zinc pyrithione, Triclosan, nano silver and/or silver-zinc-zeolite.

Surprisingly, it was found that the anti-bacterial agent in the composition in accordance with the present invention is stable towards the laser sintering conditions. In particular, the powdery particles do not agglomerate during sintering. Thus, addition of the anti-bacterial agent allows the easy and inexpensive manufacture of molded bodies for medical and pharmaceutical applications in which anti-bacterial properties are desired.

According to a further embodiment, the composition in accordance with the present invention comprises one or more flow enhancers such as precipitated or pyrogenic silicic acids and/or aluminum silicates. The flow enhancers can be used at a ratio of up to 10% w/w, preferably from 0.1 to 8% w/w, more preferably up to 6% w/w, even more preferably up to 4% w/w, even more preferably up to 3% w/w and particularly preferably up to 2% w/w, related to the overall weight of the composition.

According to another embodiment, the powdery composition comprises one or more antistatic agents such as aluminum oxide or soot. The antistatic agents are preferably present at a ratio of up to 10% w/w, more preferably from 0.1 to 8% w/w, even more preferably up to 6% w/w, even more preferably up to 4% w/w, even more preferably up to 2% w/w and particularly preferably up to 1% w/w Moreover, the composition may comprise common adjuvants and fillers, for example organic or inorganic pigments such as titanium dioxide, and fillers such as glass powder, as known in the state of the art.

The grain size of the additives including the anti-bacterial agent, flow enhancers and antistatic agents as well as the additional adjuvants and fillers is preferably in the range of the grain size of the TPU powder.

In addition, the components manufactured by using the composition in accordance with the present invention exhibit good mechanical properties. The loss in density as compared to the powdery material used is usually less than 10%, preferably between 4 and 10%. Thus, the sintered component also exhibits advantageous mechanical properties.

Therefore, in other aspects, the invention is a molded body formed by laser sintering using the composition in accordance with the present invention, as described above, and a method for the manufacture of molded bodies by selective laser sintering using the composition in accordance with the present invention.

Further, the invention relates to the use of an aliphatic TPU powder in the layer by layer manufacture of molded bodies such as selective laser sintering, with the TPU powder having a melting point of less than 135° C., a melting viscosity at 150° C. of at most 800 Pa·s and optionally one or several of the above-mentioned properties.

Although further advantages of the invention can be inferred from the following description of a working example, this should not be considered as limiting.

EXAMPLE

An aliphatic TPU powder was produced by grinding a TPU block, and sieved. The aliphatic TPU used had a melting point of 110±20° C. and a melting viscosity at 150° C. of 520 Pa·s. The crystallization temperature was approx. 40±5° C. The sieve fraction used for laser sintering exhibited the following grain size distribution (sieve analysis according to DIN 53734):

| | |
|---|---|
| 0-50 μm | 39.5% |
| 0-63 μm | 60.0% |
| 0-80 μm | 79.0% |
| 0-100 μm | 94.5% |
| 0-120 μm | 100.0% |

The bulk weight of the TPU powder obtained this way was 488 g/l, as measured according to DIN EN ISO 60.

Further properties of the aliphatic TPU used for laser sintering are listed in Table 1 below.

TABLE 1

| Mechanical properties of the TPU raw material | | | |
|---|---|---|---|
| Hardness | ISO 868 | 75 ± 10 | Shore A |
| Density | ISO 1183 | 1.18 ± 0.04 | g/cm$^3$ |

The TPU powder obtained this way was placed into a commercially available laser sintering machine at a powder bed temperature of 105° C. A $CO_2$ laser having a power of approx. 17.5 Watt at a scan velocity of approx. 5 m/s was used, to form molded bodies.

The molded bodies manufactured by laser sintering were tested in a tensile test according to DIN 53504. The mechanical properties of the component made of the TPU powder are listed in Table 2 below.

It could be shown that a loss in density of at most 10% occurred as compared to the TPU raw material used. Even after laser sintering the aliphatic TPU exhibited good mechanical properties.

TABLE 2

| Mechanical properties of the sintered component | | |
|---|---|---|
| Density | ISO 1183 | ~1.14 g/cm$^3$ |
| Tensile strength | DIN 53504 | ~9 N/mm$^2$ |
| Elongation at break | DIN 53504 | ~390% |
| E-modulus | DIN 53504 | ~50 N/mm$^2$ |

Numerous modifications and variations on the present invention are possible in light of the above teachings. It is therefore to be understood that within the scope of the appended claims, the invention may be practiced otherwise than as specifically described herein.

What is claimed is:

1. A thermoplastic polyurethane composition for use in the layer by layer manufacturing of three-dimensional molded bodies, the composition comprising at least one powder made of an aliphatic thermoplastic polyurethane (TPU), wherein the TPU has a melting temperature of less than 135° C. and a melting viscosity at 150° C. of at most 800 Pa·s, and wherein the TPU powder has a bulk density of between 480 g/l and 600 g/l, a number-average grain size d50 in a range of from 40 to 70 μm, and a maximum grain size d100 of 120 μm.

2. The composition according to claim 1 wherein the TPU powder has a grain size distribution in a range of from 0 to 110 μm.

3. The composition according to claim 1 wherein the TPU powder has a number-average grain size d50 in a range of from 50 to 60 μm.

4. The composition according to claim 1 wherein the melting viscosity of the TPU is in a range of from 200 to 700 Pa·s.

5. The composition according to claim 4 wherein the melting viscosity of the TPU is in a range of from 200 to 550 Pa·s.

6. The composition according to claim 1 wherein the TPU has a melting temperature in a range of from 90 to 120° C.

7. The composition according to claim 1 wherein the TPU powder is obtained by grinding an aliphatic thermoplastic urethane forming a ground powder, and sieving the ground powder while separating the sieve fraction of the TPU powder.

8. The composition according to claim 1 wherein the composition comprises the TPU in an amount of at least 30% w/w.

9. The composition according to claim 1 wherein the composition further comprises an anti-bacterial agent.

10. The composition according to claim 9 wherein the anti-bacterial agent is selected from the group consisting of metal powders of Ag, Zn and Cu, salts and complexes of Ag, Zn and Cu, zinc pyrithione, Triclosan and silver-zinc-zeolite.

11. A method for the manufacture of a molded body, comprising:
   providing an aliphatic thermoplastic polyurethane (TPU) having a melting temperature of less than 135° C. and a melting viscosity at 150° C. of at most 800 Pa·s;
   grinding the TPU to form a ground TPU powder;
   sieving and separating the ground TPU powder to obtain a separated sieve fraction of the ground TPU powder having a bulk density of at least 480 g/l, a number-average grain size d50 in a range of from 40 to 70 μm and a maximum grain size d100 of 120 μm; and
   subjecting the separated sieve fraction of the TPU powder to a layer-by-layer manufacturing process to form the molded body.

12. The method of claim 11 wherein the layer-by-layer manufacturing process comprises selective laser sintering.

13. The method according to claim 11 wherein the molded body is an automotive component.

14. The composition according to claim 1 wherein the TPU has a crystallization temperature in a range of from 30° C. to 80° C.

15. The composition according to claim 1 wherein the TPU powder has a bulk density in a range of from 480 g/l to 580 g/l.

* * * * *